United States Patent

Kawamoto

[11] Patent Number: 5,837,012
[45] Date of Patent: Nov. 17, 1998

[54] DYEING METHOD OF PHOTOGRAPHIC POLYESTER SUPPORT

[75] Inventor: Fumio Kawamoto, Kanagawa, Japan

[73] Assignee: Fuji Photo Film Co., Ltd., Kanagawa, Japan

[21] Appl. No.: 792,117

[22] Filed: Jan. 31, 1997

Related U.S. Application Data

[63] Continuation of Ser. No. 549,178, Oct. 27, 1995, abandoned.

[30] Foreign Application Priority Data

Oct. 28, 1994 [JP] Japan .................................. 6-265180

[51] Int. Cl.$^6$ .............................. C03C 1/78; C08L 67/02; D06P 1/20; D06P 3/36
[52] U.S. Cl. ....................... 8/489; 8/512; 8/675; 8/676; 430/521; 430/533
[58] Field of Search ..................... 8/489, 512; 430/521, 430/533, 675, 676

[56] References Cited

U.S. PATENT DOCUMENTS

| | | | |
|---|---|---|---|
| 3,822,132 | 7/1974 | Hunter | 430/521 |
| 3,918,976 | 11/1975 | Arai et al. | 96/84 R |
| 3,948,664 | 4/1976 | Okuyama et al. | 96/84 R |
| 4,191,679 | 3/1980 | Okita et al. | 8/512 |
| 4,628,025 | 12/1986 | Komaita et al. | 430/533 |

*Primary Examiner*—Margaret Einsmann
*Attorney, Agent, or Firm*—Sughrue, Mion, Zinn, Macpeak & Seas, PLLC

[57] ABSTRACT

A method for dyeing a photographic polyester support is disclosed, comprising the use of transparent pellets and a dye granulated so as to satisfy the requirements that:

(1) the particle size is 50% or more;
(2) the angle of repose is 60° or less; and
(3) the particle hardness is from 160 to 400 g on average and has a lower limit of 50 g.

3 Claims, No Drawings

DYEING METHOD OF PHOTOGRAPHIC POLYESTER SUPPORT

This is a Continuation of application Ser. No. 08/549,178 filed Oct. 27, 1995, now abandoned.

FIELD OF THE INVENTION

The present invention relates to a dyeing method of a photographic polyester support, more particularly, it relates to a simple dyeing method causing no uneven color easily.

BACKGROUND OF THE INVENTION

A polyester film generally has a high index of refraction as compared with TAC to be prone to a problem of light fogging due to so-called light piping and accordingly, needs to be dyed. Conventionally, in order to dye PET and the like, a dye may be added to the reaction system at the polymerization of pellets or pellets and a dye are in advance mixed and kneaded to formulate them into a master batch as described in JP-B-59-4174 (the term "JP-B" as used herein means an "examined Japanese patent publication"). However, these methods are cumbersome and costly and therefore, a simple method has been demanded. The simplest method is to blend pellets and dye powder immediately before melting two members to form a film, however, the dye powder is bad in handleability and involves troubles such that fluctuation of discharge (i.e., delivery) in the feeder is large and uneven density is generated. Also, in the case when two kinds of dyes are used, the color tone is changed due to the above-described troubles and the product cannot be used as a photographic support.

SUMMARY OF THE INVENTION

An object of the present invention is to provide a method for dyeing a photographic polyester support simply and at the same time, uniformly.

The object of the present invention has been achieved by a method for dyeing a photographic polyester support comprising the use of transparent pellets and a dye granulated so as to satisfy the requirements that:

(1) the particle size is 50% or more;
(2) the angle of repose is 60° or less; and
(3) the particle hardness is from 160 to 400 g on average and has a lower limit of 50 g.

The particle size as used in the present invention is obtained by weighing about 100 g of a sample and sieving it out through JIS standard sieves of 16 mesh (hole size: about 1.0 mm) and 32 mesh (hole size: about 0.5 mm) to determine the weight of particles passed 16-mesh sieve and left on 32 mesh sieve and expressed by the ratio of the weight of particles to that of the sample.

The angle of repose as used in the present invention is obtained by falling about 100 g of a sample through a funnel having a hole size of 3 mm with the drop outlet of the funnel being positioned at the height of 50 mm from the table and determining the bottom angle of the sample accumulated by means of a protractor and expressed by the average of angles measured three times.

The particle hardness as used in the present invention is obtained by placing one particle of a sample on a flat glass plate, crushing it by means of a push-pull gauge and reading the load of the gauge and expressed by the average and by the minimum value of loads measured 20 times.

The granulated dye of the present invention has a particle size of 50% or more, preferably from 50 to 100%, more preferably 70 to 100%, most preferably 85 to 100%. The angle of repose is 60° or less, preferably from 5° to 60°, more preferably 5° to 50°, most preferably 5° to 45°. The particle hardness as the average is from 160 to 400 g, preferably from 220 to 340 g, more preferably from 240 to 320 g, and the particle hardness as the minimum value (i.e., the lower limit) is 50 g or more, preferably 75 g or more, most preferably 100 g or more. The maximum value (i.e., the upper limit) is 1,000 g.

There is no particular restriction on the granulation method of the dye. For example, the dye may be dissolved in a low boiling point solvent such as methylene chloride and then agglomerated by evaporating the solvent and thereafter, the dye may be directly granulated or by means of a roller compactor. The method using a roller compactor is preferred because no solvent is used.

The dye which can be used in the present invention is preferably a compound represented by the formula (I) or (II):

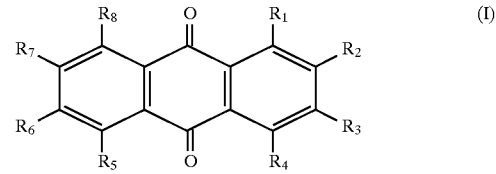

wherein $R_1$, $R_2$, $R_3$, $R_4$, $R_5$, $R_6$, $R_7$ and $R_8$, each represents a hydrogen atom, a hydroxyl group, an aliphatic group, an aromatic group, a heterocyclic group, a halogen atom, a cyano group, a nitro group, $COR_9$, $COOR_9$, $NR_9R_{10}$, $NR_{10}COR_{11}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$ or $SO_2NHCOR_{11}$, $R_9$ and $R_{10}$, each represents a hydrogen atom, an aliphatic group, an aromatic group or a heterocyclic group, $R_{11}$ represents an aliphatic group, an aromatic group or a heterocyclic group, $R_9$ and $R_{10}$ may be combined to form a 5- or 6-membered ring, and $R_1$ and $R_2$ or $R_2$ and $R_3$ may be combined to form a ring;

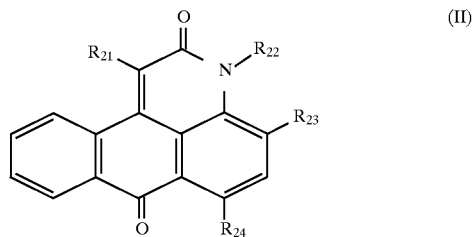

wherein $R_{21}$, $R_{23}$ and $R_{24}$, each represents a hydrogen atom, a hydroxyl group, a nitro group, a cyano group, an aliphatic group, an aromatic group, $COR_{29}$, $COOR_{29}$, $NR_{29}R_{30}$, $NR_{30}COR_{31}$, $NR_{30}SO_2R_{31}$, $R_{22}$ represents an aliphatic group or an aromatic group, $R_{29}$ and $R_{30}$, each has the same meaning as that of $R_9$ or $R_{10}$ in formula (I) and $R_{31}$ has the same meaning as that of $R_{11}$ in formula (I), provided that at least one of $R_{21}$, $R_{22}$, $R_{23}$ and $R_{24}$ is a group other than hydrogen.

The groups of formula (I) are described below in detail.

The aliphatic group represented by $R_1$ to $R_{11}$ includes an alkyl group having from 1 to 20 carbon atoms (e.g., methyl, ethyl, n-butyl, isopropyl, 2-ethylhexyl, n-decyl, n-octadecyl), a cycloalkyl group having from 1 to 20 carbon atoms (e.g., cyclopentyl, cyclohexyl) and an allyl group, and each group may have a substituent [for example, a halogen atom (e.g., F, Cl, Br, I), a hydroxyl group, a cyano group, a nitro group, a carboxylic acid group, an aryl group having from 6 to 10 carbon atoms (e.g., phenyl, naphthyl), an amino group having from 0 to 20 carbon atoms (e.g., $NH_2$, $NHCH_3$, $N(C_2H_5)_2$, $N(C_4H_9)_2$, $N(C_8H_{17})_2$, anilino, 4-methoxyanilino), an amido group having from 1 to 20 carbon atoms (e.g., acetylamino, hexanoylamino, benzoylamino, octadecanoylamino), a carbamoyl group having from 1 to 20 carbon atoms (e.g., unsubstituted carbamoyl, methylcarbamoyl, ethylcarbamoyl, octylcarbamoyl, hexadecylcarbamoyl), an ester group having from 2 to 20 carbon atoms (e.g., methoxycarbonyl, ethoxycarbonyl, phenoxycarbonyl, n-butoxycarbonyl, dodecyloxycarbonyl), an alkoxy or aryloxy group having from 1 to 20 carbon atoms (e.g., methoxy, ethoxy, butoxy, isopropoxy, benzyloxy, phenoxy, octadecyloxy), a sulfonamido group having from 1 to 20 carbon atoms (e.g., methanesulfonamido, ethanesulfonamido, butanesulfonamido, benzenesulfonamido, octanesulfonamido), a sulfamoyl group having from 0 to 20 carbon atoms (e.g., unsubstituted sulfamoyl, methylsulfamoyl, butylsulfamoyl, decylsulfamoyl) and a 5- or 6-membered heterocyclic ring (e.g., pyridyl, pyrazolyl, morpholino, piperidino, pyrrolino, benzoxazolyl)].

The aromatic group represented by $R_1$ to $R_{11}$ includes an aryl group having from 6 to 10 carbon atoms (e.g., phenyl, naphthyl) which may have a substituent [examples of the substituent include the groups described as the substituent which the above-described aliphatic group may have and in addition, an alkyl group having from 1 to 20 carbon atoms (e.g., methyl, ethyl, butyl, t-butyl, octyl)].

The heterocyclic group represented by $R_1$ to $R_{11}$ includes 5- and 6-membered heterocyclic rings (e.g., pyridine, piperidine, morpholine, pyrrolidine, pyrazole, pyrazolidine, pyrazoline, pyrazolone, benzoxazole) which may have a substituent [examples of the substituent include the groups described as the substituent which the above-described aromatic group may have)].

The 5- or 6-membered ring formed by combining $R_9$ and $R_{10}$ includes a morpholine ring, a piperidine ring and a pyrrolidine ring. The ring formed by combining $R_1$ and $R_2$ or $R_2$ and $R_3$ is preferably a 5- or 6-membered ring (e.g., benzene ring, phthalimido ring).

The groups of formula (II) are described below.

The aliphatic group represented by $R_{21}$ to $R_{24}$ has the same meaning as the aliphatic group represented by $R_1$ to $R_{11}$ of formula (I) and the aromatic group represented by $R_{21}$ to $R_{24}$ has the same meaning as the aromatic group represented by $R_1$ to $R_{11}$ of formula (I).

Specific examples of the compounds represented by formulae (I) and (II) are set forth below, but the present invention is by no means limited to these.

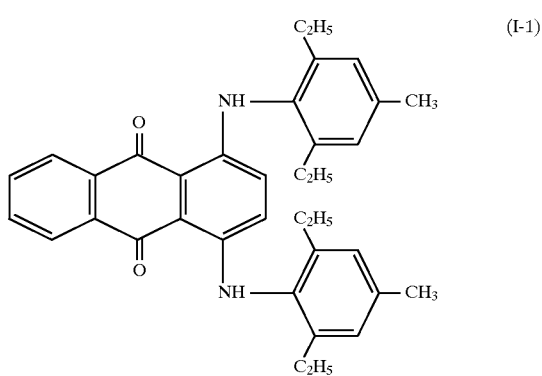
(I-1)

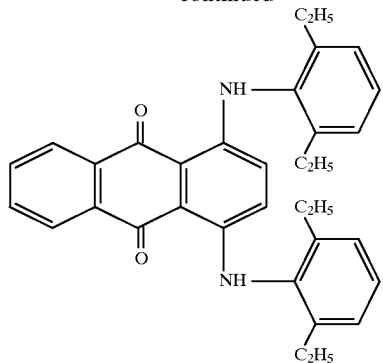
(I-2)

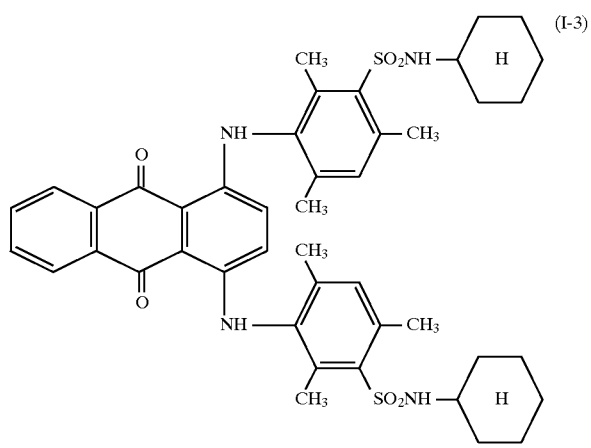
(I-3)

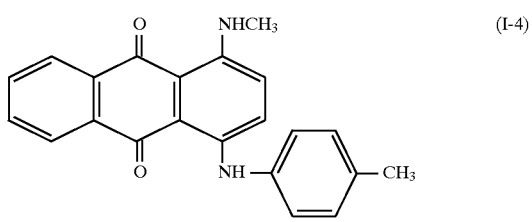
(I-4)

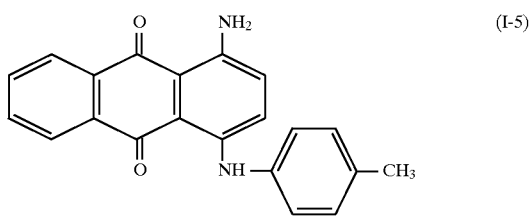
(I-5)

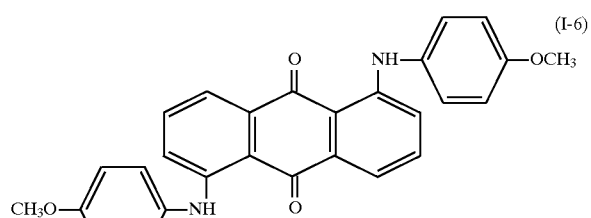
(I-6)

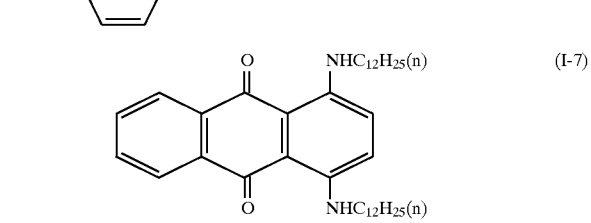
(I-7)

-continued
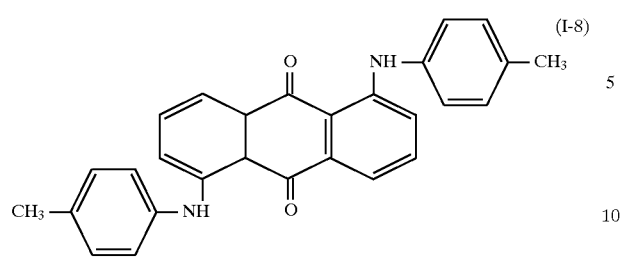
(I-8)
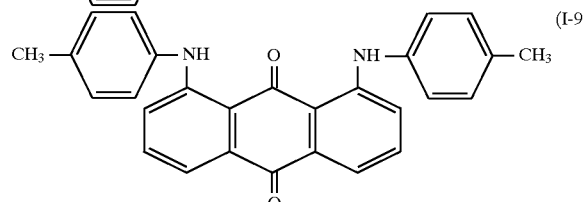
(I-9)
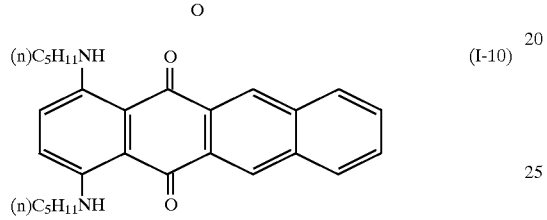
(I-10)
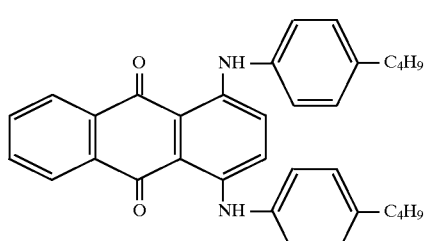
(I-11)
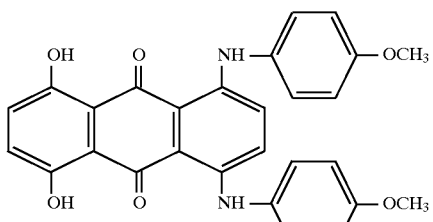
(I-12)
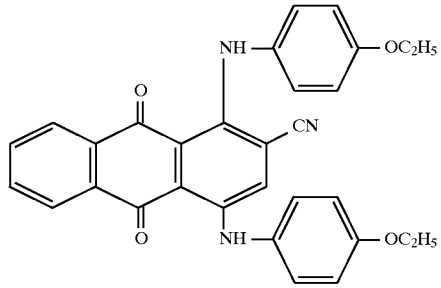
(I-13)
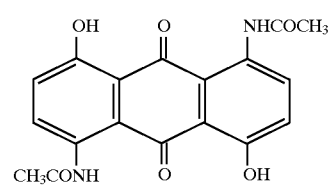
(I-14)
-continued
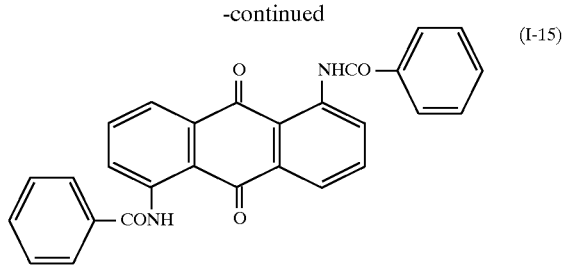
(I-15)
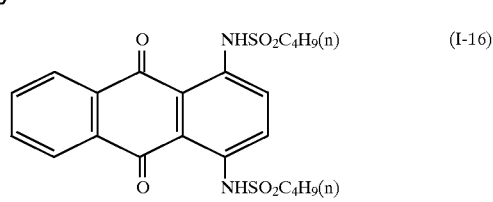
(I-16)
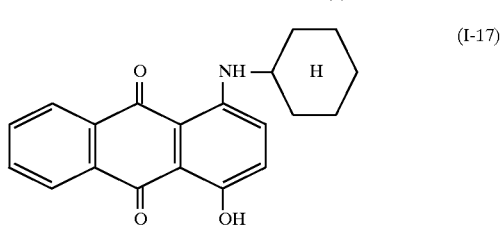
(I-17)
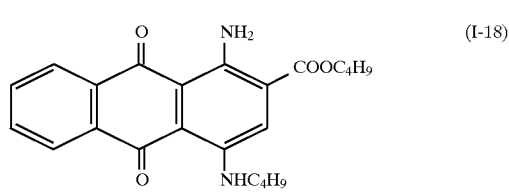
(I-18)
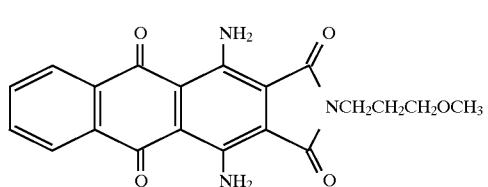
(I-19)
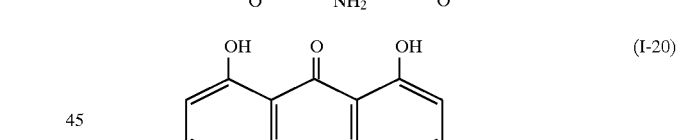
(I-20)
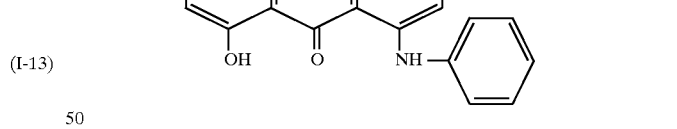
(I-21)
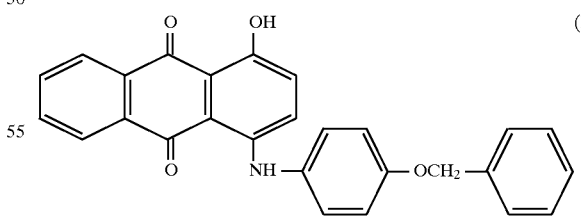
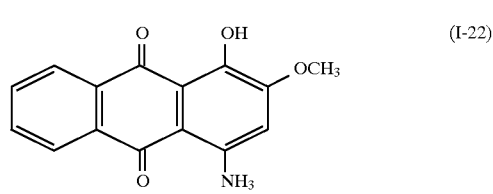
(I-22)

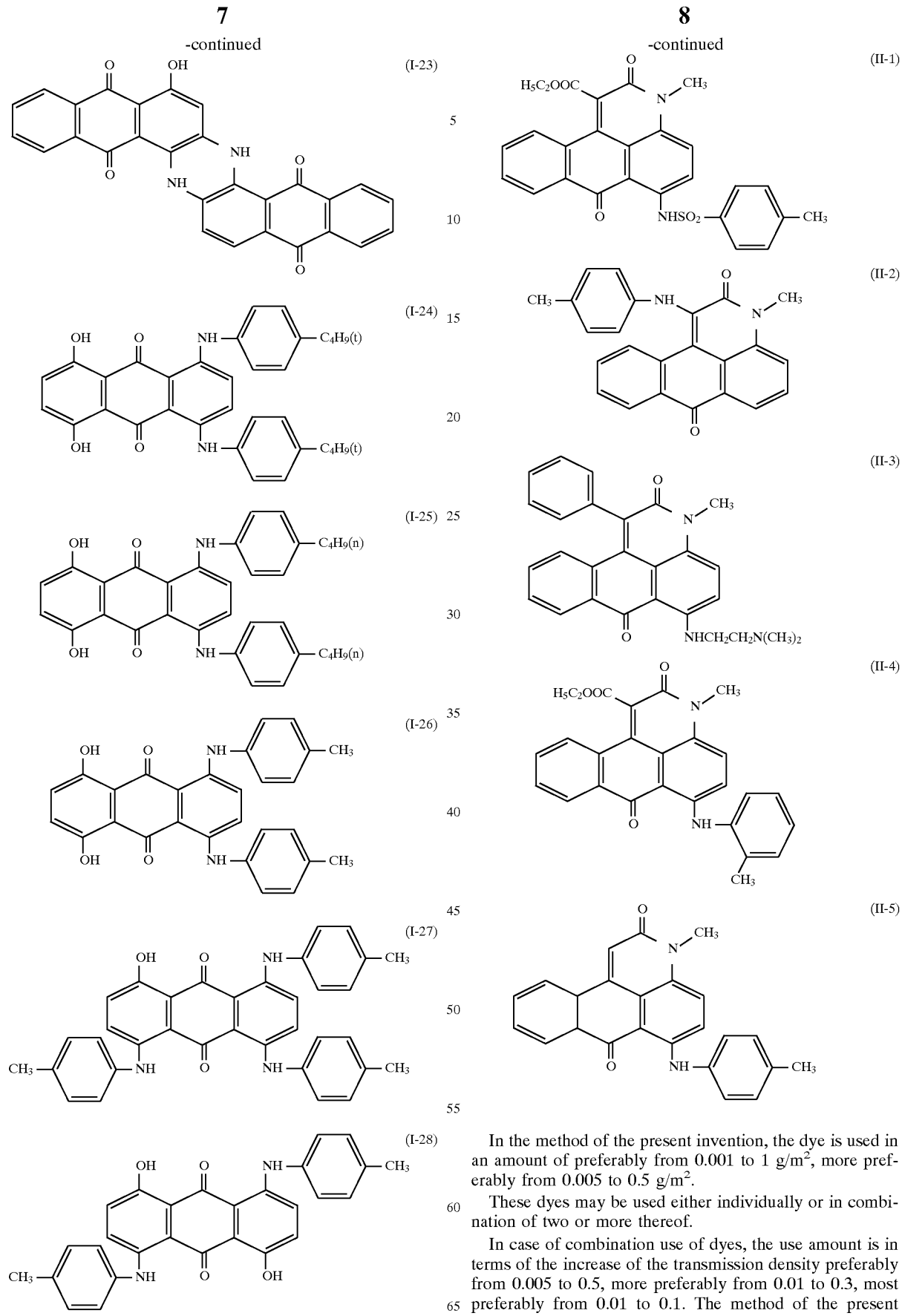

In the method of the present invention, the dye is used in an amount of preferably from 0.001 to 1 g/m², more preferably from 0.005 to 0.5 g/m².

These dyes may be used either individually or in combination of two or more thereof.

In case of combination use of dyes, the use amount is in terms of the increase of the transmission density preferably from 0.005 to 0.5, more preferably from 0.01 to 0.3, most preferably from 0.01 to 0.1. The method of the present invention is particularly effective when two or more kinds of dyes are used in combination.

The polyester support of the present invention comprises as main components a naphthalenedicarboxylic acid and/or an ester thereof and ethylene glycol.

Examples of the polyester support of the present invention include polymers such as polyethylene terephthalate (PET) and polyethylene 2,6-naphthalate (PEN).

The present invention is described below by referring to the Examples but the present invention should not be construed as being limited thereto.

EXAMPLE

1) Granulation of Dye

A dye was placed in a hopper, pressed by means of a compactor ("Model WP160x60B", manufactured by Turbo Kogyo KK) and then shaken for 10 minutes in an automatic shaker having installed therein a 16-mesh sieve and a 32-mesh sieve at the upper portion and the lower portion, respectively. The dyes left on the 32-mesh sieve were taken out.

2) Film Formation and Dyeing of Support

PET (gray colored):

100 Parts by weight of polyethylene terephthalate having an intrinsic viscosity of 0.60, 0.005 part by weight of spherical silica having an average particle size of 0.3 μm and a length/breadth ratio of 1.07, 54 ppm of a dye of Compound I-24 and 54 ppm of a dye of Compound I-6, each dye being granulated as described above, were dried by an ordinary manner, melted at 300° C., extruded from a T-die, longitudinally stretched at 120° C. to 3.3 times, transversely stretched at 110° C. to 3.3 times and then heat-fixed at 250° C. for 6 seconds to obtain a sample having a thickness of 90 μm, a width of 1.5 m and a length of 3,000 m.

PET (blue colored):

100 Parts by weight of polyethylene terephthalate having an intrinsic viscosity of 0.60, 0.005 part by weight of spherical silica having an average particle size of 0.3 μm and a length/breadth ratio of 1.07, 65 ppm of a dye of Compound I-24 and 240 ppm of a dye of Compound II-3, each dye being granulated as described above, were dried by an ordinary manner, melted at 300° C., extruded from a T-die, longitudinally stretched at 120° C. to 3.3 times, transversely stretched at 110° C. to 3.3 times and then heat-fixed at 250° C. for 6 seconds to obtain a sample having a thickness of 90 μm, a width of 1.5 m and a length of 3,000 m.

PEN (grey colored):

100 Parts by weight of polyethylene-2,6-naphthalate having an intrinsic viscosity of 0.60, 0.005 part by weight of spherical silica having an average particle size of 0.3 μm and a length/breadth ratio of 1.07, 54 ppm of a dye of Compound I-24 and 54 ppm of a dye of Compound I-6, each dye being granulated as described above, were dried by an ordinary manner, melted at 300° C., extruded from a T-die, longitudinally stretched at 120° C. to 3.3 times, transversely stretched at 110° C. to 3.3 times and then heat-fixed at 250° C. for 6 seconds to obtain a sample having a thickness of 90 μm, a width of 1.5 m and a length of 3,000 m.

PEN (blue colored):

100 Parts by weight of polyethylene-2,6-naphthalate having an intrinsic viscosity of 0.60, 0.005 part by weight of spherical silica having an average particle size of 0.3 μm and a length/breadth ratio of 1.07, 65 ppm of a dye of Compound I-24 and 240 ppm of a dye of Compound II-3, each dye being granulated as described above, were dried by an ordinary manner, melted at 300° C., extruded from a T-die, longitudinally stretched at 120° C. to 3.3 times, transversely stretched at 110° C. to 3.3 times and then heat-fixed at 250° C. for 6 seconds to obtain a sample having a thickness of 90 μm, a width of 1.5 m and a length of 3,000 m.

3) Determination of Color Density

The thus-obtained films were measured on the transmission density for the grey-colored base by means of X-RITE Status M (manufactured by X-RITE Co., Ltd.) and for the blue-colored base by means of X-Rite Status A (manufactured by X-RITE Co., Ltd.). The measurement was made on 150 points at an interval of 1 cm in the width direction and on 200 points at the top to the last of 3,000 m in the length direction. The measurement results are shown in Tables 1 and 2.

TABLE 1

| | | Granulation | | | | Color Density | | | | |
| | | Particle size (%) | Angle of repose (°) | Particle hardness (g) | | B density | | G density | | R density | |
| | Base | | | Average | Minimum | max-min | σ | max-min | σ | max-min | σ |
|---|---|---|---|---|---|---|---|---|---|---|---|
| Example 1 | PET blue | 55 | 55 | 180 | 55 | 0.02 | 0.0091 | 0.02 | 0.0137 | 0.03 | 0.0164 |
| Example 2 | PET blue | 75 | 55 | 180 | 55 | 0.02 | 0.0082 | 0.02 | 0.0125 | 0.02 | 0.0150 |
| Example 3 | PET blue | 90 | 55 | 180 | 55 | 0.02 | 0.0072 | 0.02 | 0.0108 | 0.02 | 0.0130 |
| Example 4 | PET blue | 90 | 42 | 180 | 55 | 0.02 | 0.0059 | 0.02 | 0.0086 | 0.02 | 0.0103 |
| Example 5 | PET blue | 90 | 42 | 280 | 55 | 0.01 | 0.0041 | 0.02 | 0.0062 | 0.01 | 0.0071 |
| Example 6 | PET blue | 90 | 42 | 280 | 120 | 0.01 | 0.0031 | 0.01 | 0.0035 | 0.01 | 0.0042 |
| Comparative Example 1 | PET blue | 45 | 65 | 140 | 45 | 0.09 | 0.023 | 0.1 | 0.0345 | 0.1 | 0.0414 |
| Example 7 | PET grey | 55 | 55 | 180 | 55 | 0.02 | 0.0099 | 0.02 | 0.0109 | 0.03 | 0.0112 |
| Example 8 | PET grey | 75 | 55 | 180 | 55 | 0.02 | 0.0091 | 0.02 | 0.0096 | 0.02 | 0.0109 |
| Example 9 | PET grey | 90 | 55 | 180 | 55 | 0.02 | 0.0082 | 0.02 | 0.009 | 0.02 | 0.0098 |
| Example 10 | PET grey | 90 | 42 | 180 | 55 | 0.02 | 0.0063 | 0.02 | 0.0069 | 0.02 | 0.0076 |
| Example 11 | PET grey | 90 | 42 | 280 | 55 | 0.01 | 0.0045 | 0.01 | 0.0051 | 0.01 | 0.0053 |
| Example 12 | PET grey | 90 | 42 | 280 | 120 | 0.01 | 0.0021 | 0.01 | 0.0022 | 0.01 | 0.0025 |
| Comparative Example 2 | PET grey | 45 | 65 | 140 | 45 | 0.08 | 0.026 | 0.09 | 0.0286 | 0.11 | 0.0312 |

TABLE 2

| | | Granulation | | | | Color Density | | | | |
| | | Particle size (%) | Angle of repose (°) | Particle hardness (g) | | B density | | G density | | R density | |
| | Base | | | Average | Minimum | max-min | σ | max-min | σ | max-min | σ |
|---|---|---|---|---|---|---|---|---|---|---|---|
| Example 13 | PEN blue | 55 | 55 | 180 | 55 | 0.02 | 0.0089 | 0.02 | 0.0122 | 0.03 | 0.0146 |
| Example 14 | PEN blue | 75 | 55 | 180 | 55 | 0.02 | 0.0083 | 0.02 | 0.0111 | 0.02 | 0.0133 |
| Example 15 | PEN blue | 90 | 55 | 180 | 55 | 0.02 | 0.0074 | 0.02 | 0.0105 | 0.02 | 0.0126 |
| Example 16 | PEN blue | 90 | 42 | 180 | 55 | 0.02 | 0.0059 | 0.02 | 0.0082 | 0.02 | 0.0098 |
| Example 17 | PEN blue | 90 | 42 | 280 | 55 | 0.01 | 0.0042 | 0.02 | 0.0058 | 0.01 | 0.0071 |
| Example 18 | PEN blue | 90 | 42 | 280 | 120 | 0.01 | 0.0029 | 0.01 | 0.0035 | 0.01 | 0.0036 |
| Comparative Example 3 | PEN blue | 45 | 65 | 140 | 45 | 0.09 | 0.025 | 0.1 | 0.0375 | 0.1 | 0.0444 |
| Example 19 | PEN grey | 55 | 55 | 180 | 55 | 0.02 | 0.0096 | 0.02 | 0.0106 | 0.03 | 0.0109 |
| Example 20 | PEN grey | 75 | 55 | 180 | 55 | 0.02 | 0.0091 | 0.02 | 0.0096 | 0.02 | 0.0109 |
| Example 21 | PEN grey | 90 | 55 | 180 | 55 | 0.02 | 0.0083 | 0.02 | 0.0091 | 0.02 | 0.0096 |
| Example 22 | PEN grey | 90 | 42 | 180 | 55 | 0.02 | 0.0066 | 0.02 | 0.0073 | 0.02 | 0.0079 |
| Example 23 | PEN grey | 90 | 42 | 280 | 55 | 0.01 | 0.0043 | 0.01 | 0.0051 | 0.01 | 0.0053 |
| Example 24 | PEN grey | 90 | 42 | 280 | 120 | 0.01 | 0.0022 | 0.01 | 0.0022 | 0.01 | 0.0025 |
| Comparative Example 4 | PEN grey | 45 | 65 | 140 | 45 | 0.08 | 0.032 | 0.09 | 0.0352 | 0.11 | 0.0384 |

It is clearly seen from the results in Tables 1 and 2 that by using the dye granulated according to the method of the present invention, a photographic polyester film free of uneven color can be obtained.

According to the present invention, the photographic polyester support can be dyed simply and safely to prevent light piping without causing any uneven color.

While the invention has been described in detail and with reference to specific embodiments thereof, it will be apparent to one skilled in the art that various changes and modifications can be made therein without departing from the spirit and scope thereof.

What is claimed is:

1. A method for dyeing a photographic polyester support before said polyester support is completely formed comprising the steps of:
   (a) granulating a dye by a roller compactor,
   (b) dyeing transparent polyester pellets by mixing transparent polyester pellets with the granulated dye, and
   (c) melting, extruding and stretching the resulting product of part (b) to form a dyed photographic polyester support, wherein said dye satisfies the following requirements:
   (1) a particle size such that at least 50% of the particles pass through a 16 mesh sieve and remain on a 32 mesh sieve;
   (2) an angle of repose of 60° or less;
   (3) a particle hardness of from 160 to 400 g on average having a lower limit of 50 g; and
   (4) is represented by at least one of formula (I) and (II):

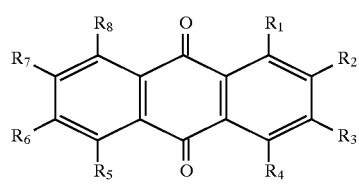

wherein $R_1$, $R_2$, $R_3$, $R_4$, $R_5$, $R_6$, $R_7$ and $R_8$, each represents a hydrogen atom, a hydroxyl group, an aliphatic group, an aromatic group, a heterocyclic group, a halogen atom, a cyano group, a nitro group, $COR_9$, $COOR_9$, $NR_9R_{10}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$, or $SO_2NHCOR_{11}$, $R_9$ and $R_{10}$, each represents a hydrogen atom, an aliphatic group, an aromatic group or a heterocyclic group, $R_{11}$ represents an aliphatic group, an aromatic group, $R_9$ and $R_{10}$ may be combined to form a 5- or 6-membered ring, and $R_1$ and $R_2$ or $R_2$ and $R_3$ may be combined to form a ring;

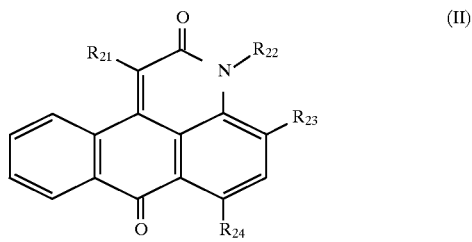

wherein $R_{21}$, $R_{23}$ and $R_{24}$, each represents a hydrogen atom, a hydroxyl group, a nitro group, a cyano group, an aliphatic group, an aromatic group, $COR_{29}$, $COOR_{29}$, $NR_{29}R_{30}$, $NR_{30}COR_{31}$, $NR_{30}SO_2R_{31}$, $R_{22}$ represents an aliphatic group or an aromatic group, $R_{29}$ and $R_{30}$, each has the same meaning as that of $R_9$ or $R_{10}$ in formula (I) and $R_{31}$ has the same meaning as that of $R_{11}$ in formula (I), provided that at least one of $R_{21}$, $R_{22}$, $P_{23}$ and $R_{24}$ is a group other than hydrogen.

2. The method for dyeing a photographic polyester support as claimed in claim 1, said polyester support comprises as main components a naphthalenedicarboxylic acid an ester thereof or both and ethylene glycol.

3. The method for dyeing a photographic polyester support as claimed in claim 1, wherein said support comprises polyethylene terephthalate, polyethylene-2,6-naphthalene dicarboxylate or mixture thereof.

* * * * *